United States Patent [19]
Chung et al.

[11] Patent Number: 6,031,041
[45] Date of Patent: Feb. 29, 2000

[54] POLYURETHANE HYBRID DISPERSIONS AND COATINGS HAVING INCREASED WET ADHESION AND SOLVENT RESISTANCE

[75] Inventors: Jocelyn K. Chung, Whitby, Canada; Sharon P. Lee, Edison, N.J.; Rajeev Farwaha, Brampton, Canada

[73] Assignee: National Starch and Chemical Investment Holding Corporation, Wilmington, Del.

[21] Appl. No.: 09/172,397

[22] Filed: Oct. 14, 1998

[51] Int. Cl.⁷ .............................. C08J 3/00; C08K 3/20; C08L 75/00; B05D 3/02; B32B 27/00

[52] U.S. Cl. ................ 524/507; 427/372.2; 427/385.5; 428/423.1; 524/539; 524/591; 524/840

[58] Field of Search ................... 524/507, 539, 524/839, 591, 840; 428/423.1; 427/372.2, 385.5

[56] References Cited

U.S. PATENT DOCUMENTS

| | | | |
|---|---|---|---|
| 3,684,759 | 8/1972 | Reiff et al. | 260/29.6 NR |
| 3,705,164 | 12/1972 | Honig et al. | 260/29.6 NR |
| 4,198,330 | 4/1980 | Kaizerman et al. | 260/29.6 R |
| 4,318,833 | 3/1982 | Guagliardo | 524/457 |
| 4,644,030 | 2/1987 | Loewrigkeit et al. | 524/457 |
| 4,730,021 | 3/1988 | Zom et al. | 524/457 |
| 4,888,383 | 12/1989 | Huybrechts | 524/832 |
| 4,918,129 | 4/1990 | Probst et al. | 524/457 |
| 4,927,876 | 5/1990 | Coogan et al. | 524/457 |
| 4,954,559 | 9/1990 | Den Hartog et al. | 524/507 |
| 5,011,881 | 4/1991 | Fujii et al. | 524/457 |
| 5,137,961 | 8/1992 | Goos et al. | 524/457 |
| 5,141,983 | 8/1992 | Hasegawa et al. | 524/457 |
| 5,354,807 | 10/1994 | Dochniak | 524/591 |
| 5,571,861 | 11/1996 | Klein et al. | 524/591 |
| 5,623,016 | 4/1997 | Klein et al. | 524/591 |
| 5,739,196 | 4/1998 | Jenkins et al. | 524/460 |

*Primary Examiner*—Patrick D. Niland
*Attorney, Agent, or Firm*—John D. Thallemer

[57] ABSTRACT

A polyurethane hybrid dispersion comprising a carboxylated polyurethane dispersion and a functionalized polymer. The functionalized polymer is the emulsion polymerization product of an ethylenically unsaturated monomer and from 0.1 to 5 pphm of a ureido functional comonomer, wherein the functionalized polymer is prepared in the presence of the carboxylated polyurethane dispersion. he polyurethane hybrid dispersions of the invention exhibit improved wet adhesion to alkyd substrates. Moreover, the polyurethane hybrid dispersions provide the treated substrates with improved solvent resistance.

29 Claims, No Drawings

POLYURETHANE HYBRID DISPERSIONS AND COATINGS HAVING INCREASED WET ADHESION AND SOLVENT RESISTANCE

FIELD OF THE INVENTION

The present invention relates to polyurethane hybrid dispersions comprising a carboxylated polyurethane dispersion and a functionalized polymer. The functionalized polymer is the emulsion polymerization product of an ethylenically unsaturated monomer and from 0.1 to 5 pphm of a ureido functional comonomer, wherein the functionalized polymer is prepared in the presence of the carboxylated polyurethane dispersion

BACKGROUND OF THE INVENTION

Until recently, the resin systems used in coatings, e.g., for architectural paints or wood finishes, were delivered in organic solvent systems. Since organic solvent systems release volatile organic compounds into the air, it is desirable to replace organic solvent systems with waterborne systems. The challenge is to develop waterborne systems which can provide performance benefits, such as high gloss, water resistance, chemical/solvent resistance, and abrasion resistance, which are comparable to organic solvent systems.

It is known that aqueous acrylic dispersions are useful as binders for waterborne coatings. Aqueous acrylic dispersions, stabilized by surfactants, are commonly employed in paints, inks, varnishes and adhesives. In paints, the choice of surfactants for stabilization of the polymeric dispersion in water can provide small particle size latices, resulting in high gloss coatings.

It is also known that aqueous polyurethane dispersions can be employed in waterborne coatings. In comparison to acrylics, polyurethanes are known to have better mechanical properties such as abrasion resistance, scratch and mar resistance, film toughness, and better solvent resistance. The polyurethane systems, however, are more costly due to the cost of the urethane raw material.

To optimize cost/performance benefits, coatings formulators have employed combinations of aqueous polyurethane and acrylic dispersions, physically blended together. Such blended dispersions can provide enhanced performance as compared to all acrylics and cost benefits as compared to all polyurethanes, but there are some inherent limitations to blended systems. Many polyurethane/acrylic dispersions are incompatible, resulting in unstable blends which may phase separate, gel or discolor upon storage. Furthermore, the homogeneity of the polyurethane/acrylic blends is questionable, both in the wet state and most importantly in the final dried coating.

Instead of merely mixing the polyurethane and acrylic dispersions together in a post-polymerization stage, polyurethane/acrylic hybrid dispersions have been formed in situ, as described in U.S. Pat. Nos. 4,927,876; 4,954,559; 5,354,807; 4,888,383; 4,918,129; 5,011,881; 3,684,759; 3,705,164; 4,198,330; 5,141,983; 4,644,030; 4,318,833; and 4,730,021; 5,137,961; 5,623,016; and 5,571,861. In this approach, ethylenically unsaturated monomers are polymerized by means of free radical polymerization in the presence of a preformed polyurethane dispersion. Each dispersion particle is stabilized by the hydrophilic moieties of the polyurethane, usually anionic groups in the polyurethane backbone. The resulting polyurethane/acrylic hybrid dispersion comprises acrylic and urethane polymer chains which are intimately mixed at the molecular level within each dispersion particle.

There continues to be a need, however, for coating formulations prepared with polyurethane/acrylic hybrid dispersions which provide superior wet resistance to alkyd substrates and solvent resistance without the disadvantages of prior art coatings.

SUMMARY OF THE INVENTION

Accordingly, it is an object of the invention to provide a waterborne coating composition.

It is another object of the invention to provide a waterborne coating which exhibits improved wet adhesion to alkyd substrates.

It is also an object of the invention to provide a waterborne coating which provides substrates with solvent resistance.

With regard to the foregoing and other objects, the present invention provides a polyurethane hybrid dispersion comprising:

(a) 10 to 95 weight percent of a carboxylated polyurethane dispersion with at least 0.6 milliequivalents of carboxyl per gram of polyurethane, which is the reaction product comprising
  (I) at least one diisocyanate;
  (II) at least one polyester diol; and
  (III) at least one carboxylated diol; and
(b) 5 to 90 weight percent of a functionalized polymer which is the emulsion polymerization product comprising at least one ethylenically unsaturated monomer and from 0.1 to 5 pphm of at least one ureido functional comonomer, wherein the functionalized polymer is prepared in the presence of the carboxylated polyurethane dispersion, and wherein the weight percents of the carboxylated polyurethane dispersion (a) and functionalized polymer (b) are based on the total solids of the polyurethane hybrid dispersion.

According to another aspect the invention provides a method for providing a solvent resistant coating on at least one surface of an article comprising: i) preparing the polyurethane hybrid dispersion as described above; (ii) applying the polyurethane hybrid dispersion to an article; and (iii) curing the polyurethane hybrid dispersion with air to form a film.

According to an additional aspect the invention provides a polyurethane hybrid dispersion comprising: (a) a carboxylated polyurethane dispersion as described above; and (b) a functionalized polymer which is the emulsion polymerization product comprising at least one ethylenically unsaturated monomer and from 0.1 to 5 pphm of at least one ureido functional comonomer and a second comonomer which is selected from the group consisting of 0.01 to 2 pphm of a multifunctional monomer, 0.1 to 10 pphm of a silane monomer, and combinations thereof, wherein the functionalized polymer is prepared in the presence of the carboxylated polyurethane dispersion, and wherein the weight percents of the carboxylated polyurethane dispersion (a) and functionalized polymer (b) are based on the total solids of the polyurethane hybrid dispersion.

According to a further aspect the invention provides a polyurethane hybrid dispersion comprising:

(a) 10 to 95 weight percent of a carboxylated polyurethane dispersion with at least 0.6 milliequivalents of carboxyl per gram of polyurethane, which is the reaction product comprising
  (I) at least one diisocyanate;
  (II) at least one polyester diol;
  (III) at least one carboxylated diol; and (IV) from about 0.1 to about 5 pphm of at least one ureido functional comonomer; and (b) 5 to 90 weight percent of a functionalized polymer which is the emulsion polymerization product comprising at least one ethylenically unsaturated monomer, wherein the functionalized polymer is prepared in the presence of the carboxylated polyurethane dispersion, and wherein the weight percents of the carboxylated polyurethane dispersion (a) and functionalized polymer (b) are based on the total solids of the polyurethane hybrid dispersion.

The polyurethane hybrid dispersions of the invention exhibit improved wet adhesion to alkyd substrates due to the interaction of the ureido functional groups with the ester groups on the alkyd substrate. Moreover, the polyurethane hybrid dispersions provide substrates treated therewith with improved solvent resistance due to crosslinking provided by the multifunctional and/or silane comonomers.

DESCRIPTION OF THE INVENTION

The polyurethane hybrid dispersions of the invention comprise (a) a carboxylated polyurethane dispersion and (b) a functionalized polymer. The functionalized polymer is an emulsion polymerization product comprising at least one ethylenically unsaturated monomer and from about 0.1 to about 5 parts per hundred monomer (pphm) of at least one ureido functional comonomer. The functionalized polymer is prepared in the presence of the carboxylated polyurethane dispersion. In the alternative, instead of preparing the functionalized polymer with a ureido functional comonomer, the carboxylated polyurethane may be prepared with 0.1 to 5 parts per hundred monomer (pphm) of at least one ureido functional comonomer.

The carboxylated polyurethane is prepared by subjecting (I) at least one diisocyanate; (II) at least one polyester diol; and (III) at least one carboxylated diol; and optionally (IV) from about 0.1 to about 5 pphm of at least one ureido functional comonomer, to a urethane-forming reaction to prepare a carboxylated polyurethane prepolymer, subjecting the carboxylated polyurethane prepolymer to neutralization and optionally chain extension.

Suitable diisocyanates include 2,4-tolylene diisocyanate, 2,6-tolylene diisocyanate, 4,4'-diphenylmethane diisocyanate, m-phenylene diisocyanate, xylylene diisocyanate, tetra-methylene diisocyanate, lysine diisocyanate, 1,4-cyclohenxylene diisocyanate, 4,4'dicyclohexylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, 4,4'-methylene-bis(cyclohexyl isocyanate), isophorone diisocyanate, and hexamethylene diiisocyanate, benzene, 1,3-bis(1-isocyanate-1-methylethyl), 4,4'-methylenebis(phenyl isocyanate), and toluene 2,4-diisocyanate. Preferably the diisocyanate is selected from 4,4'-methylene-bis(cyclohexyl isocyanate), isophorone diisocyanate, and hexamethylene diiisocyanate. A combination of diisocyanates may also be used.

The polyester diol can be any compound obtained by reacting at least one polyhydric alcohol and at least one polycarboxylic acid or polycarboxylic anhydride. Examples of polyhydric alcohols include ethylene glycol, propylene glycol, diethylene glycol, neopentyl glycol, 1,4-butanediol, and cyclohexanedimethanol. Preferably the polyhydric alcohol is neopentyl glycol. Examples of polycarboxylic acids include succinic acid, glutaric acid, adipic acid, and phthalic acid or phthalic anhydride. Preferably the polycarboxylic acid is adipic acid. A preferred polyester diol is neopentyl adipate. A combination of polyester diols may also be used.

Suitable carboxylated diols include 2,2-dimethylolpropionic acid, 2,2-dimethylol-butyric acid, 2,2-dimethylolvaleric acid, etc., and a carboxylated polyester diol. The preferred carboxylated diol is 2,2-dimethylolpropionic acid. A combination of carboxylated diols may also be used.

The diisocyanate, polyester diol and carboxylated diol are reacted to form a carboxylated polyurethane in the presence or absence of solvent. Optionally, organic solvents may be added to the carboxylated polyurethane in order to adjust the viscosity. Suitable solvents include nonprotic solvents such as dioxane, acetone, methyl ethyl ketone, N-methylpyrrolidone, tetrahydrofuran, and N-vinyl acetate.

The carboxylate groups on the carboxylated polyurethane impart water-dispersibility to the polyurethane, i.e., colloidal stabilization in water. Preferably the sum total of equivalents of carboxyl functional groups in the polyurethane is at least 0.6 milliequivalents per gram of polyurethane.

The carboxyl functional groups on the carboxylated polyurethane are neutralized with an amine such as trimethylamine, triethylamine, tri-n-propylamine, tributylamine, triethanolamine, and the like; sodium hydroxide, potassium hydroxide, ammonia, etc. The neutralized carboxylated polyurethane is dispersed in water to form the carboxylated polyurethane dispersion.

With NCO terminated polyurethane prepolymers, water may be used as a chain extending agent. Optionally, the water may contain a chain extending agent, such as a polyamine. Preferred chain extending agents include piperazine, piperazine hexahydrate, diethylene triamine, triethylene tetraamine, and ethylene diamine.

The functionalized polymer, component (b), of the polyurethane hybrid dispersion is polymerized in the presence of the carboxylated polyurethane dispersion, component (a). The functionalized polymer is the reaction product of at least one ethylenically unsaturated monomer, and optionally from about 0.1 to about 5 pphm of at least one ureido functional comonomer. Suitable ethylenically unsaturated monomers include the alkyl esters of acrylic and methacrylic acid, unsubstituted or substituted acrylamides, and vinyl esters. Combinations of ethylenically unsaturated monomers may also be used.

Suitable alkyl esters of acrylic and methacrylic acid are, for example, methyl methacrylate, butyl acrylate, methyl acrylate, ethyl acrylate, ethyl methacrylate, etc. Suitable vinyl esters are, for example, vinyl acetate, vinyl formate, vinyl propionate, vinyl butyrate, vinyl isobutyrate, vinyl valerate, vinyl 2-ethyl-hexanoate, vinyl esters of carboxylic acids such as the vinyl ester of neo-nonanoic, neo-decanoic, neo-pentanoic and 2-ethylhexanoic acids. Preferred ethylenically unsaturated monomers are methyl methacrylate and butyl acrylate.

The ethylenically unsaturated monomers are used in such a ratio that the glass transition temperature (Tg) of the functionalized polymer is from 20° C. to 80° C., preferably 30° C. to 60° C.

Suitable ureido functional comonomers include methacrylamidoethylethylene urea, N-(2-methacryloyloxyethyl) ethylene urea, N-methacryloyl urea, 2-(1-imidazolyl) ethyl methacrylate, 2-(1-imidazolidin-2-on)ethylmethacrylate, and N-(methacrylamido)ethyl urea. Combinations of ureido functional comonomers may also be used. Preferably, the ureido functional comonomer is methacrylamidoethylethylene urea or N-(2-methacryloyloxyethyl)ethylene urea.

The amount of ureido functional comonomer used to prepare the functionalized polymer or the carboxylated polyurethane is from about 0.1 to about 5 pphm. Preferably, the ureido functional comonomer is present in an amount of from about 0.5 to about 2 pphm.

A multifunctional monomer having two or more vinyl groups and/or a silane monomer may be used to prepare the functionalized polymer. It is within the scope of the invention to employ a combination of multifunctional monomers and silane monomers in the preparation of the functionalized polymer. The multifunctional monomer is preferably a diacrylate monomer.

Suitable multifunctional monomers include 1,6-hexanediol dimethacrylate, allyl methacrylate, 1,4-butanediol dimethacrylate, butanediol diacrylate, 1,3-butanediol dimethacrylate, polyglycol 400-dimethacrylate, neopentyl glycol dimethacrylate, triethylene glycol dimethacrylate, trimethylolpropane trimethacrylate, ethylene glycol dimethacrylate, diethylene glycol dimethacrylate, tetraethylene glycol dimethacrylate, trimethylolpropane trimethacrylate, 1,12-dodecanediol dimethacrylate, methacrylic anhydride, bisphenol-A-dimethacrylate, ethoxylated bisphenol-A-dimethacrylate, triethyleneglycol dimethacrylate, dicyclopentyl acrylate, tetraethoxylated bisphenol-A-diacrylate, tetraethylene glycol dimethacrylate, trimethylolpropane triethoxy triacrylate, diallyl phthalate, diallyl maleate, triallyl cyanurate, divinylbenzene, and allyl-methacrylate. Most preferably the multifunctional monomer is 1,6-hexanediol dimethacrylate. A combination of multifunctional monomers may also be used to prepare the functionalized polymer.

The amount of multifunctional monomer used to prepare the functionalized polymer is from about 0.01 to about 2 pphm, preferably from about 0.1 to about 1 pphm. The multifunctional monomer has been determined to provide enhanced chemical resistance to coatings prepared therewith by crosslinking during the polymerization of the functionalized polymer.

Suitable silane monomers include vinyltriisopropoxysilane, vinyltrimethoxysilane, vinyltriethoxysilane, vinyl-tris-(2-methoxyethoxy) silane, vinylmethyldimethoxysilane, and gamma-methacryloxypropyltrimethoxysilane. Preferably, the silane monomer is vinyltriisopropoxysilane. Combinations of silane monomers may also be used to prepare the functionalized polymer.

The amount of silane monomer used to prepare the functionalized polymer is from about 0.1 to about 10 pphm, preferably from about 0.1 to 5 pphm, most preferably from about 0.2 to about 2 pphm. The silane monomer has been determined to provide enhanced chemical resistance to coatings prepared therewith by crosslinking during film formation.

It is within the scope of the invention to prepare the polyurethane hybrid dispersions with additional functional monomers in order to provide the latex with additional beneficial properties. A preferred additional functional monomer is a UV stabilizing monomer, such as NORBLOC 7966 which is available from Janssen Pharmaceutica. In addition, the functional monomers may also be crosslinking monomers such as N-methylolacrylamide, m-isopropenyl-α,α'-dimethylbenzene isocyanate, dimethylaminopropylmeth-acrylamide epichlorohydrine, and glycidyl methacrylate.

A surfactant is used to prepare the functionalized polymer. Preferably the surfactant is a nonionic surfactant such as linear alcohol ethoxylates, ethoxylated polyglycosides and alkyl phenol ethoxylates. Combinations of surfactant may also be used to prepare functionalized polymer. The surfactant is present during the polymerization of the ethylenically unsaturated monomer(s) in an amount of from about 0.1 pphm to about 5 pphm. Preferably the surfactant is present in an amount of from about 0.5 pphm to about 2 pphm, based on the monomers used to prepare the functionalized polymer.

The polyurethane hybrid dispersion of the invention contains (a) 10 to 95 weight percent of the carboxylated polyurethane dispersion and (b) 5 to 90 weight percent of the functionalized polymer. Such weight percents are based on the total solids of the polyurethane hybrid dispersion. Preferably, the polyurethane hybrid dispersion of the invention contains (a) 20 to 50 weight percent of the carboxylated polyurethane dispersion and (b) 50 to 80 weight percent of the functionalized polymer. More preferably, the polyurethane hybrid dispersion of the invention contains (a) 25 to 40 weight percent of the carboxylated polyurethane dispersion and (b) 60 to 75 weight percent of the functionalized polymer.

The polyurethane hybrid dispersions may additionally be formulated with one or more additives which are commonly incorporated into coatings. Such additives include defoamers, thickeners, wetting agents, coalescing agents, slip aids, pigments, fillers, dyes, and plasticizers.

The polyurethane hybrid dispersions of the invention exhibit improved wet and dry adhesion to alkyd substrates, especially as a wood finish suitable for furniture, wood flooring, trim, and moldings, etc. Moreover, the polyurethane hybrid dispersions provide the treated substrates with improved solvent resistance.

The following nonlimiting examples illustrate further aspects of the invention.

EXAMPLE 1

Preparation of an Aqueous Polyurethane Dispersion.

A mixture containing 136 grams of neopentyl adipate (1000 Mw), 3.54 grams of neopentyl glycol and 24 grams of dimethylolpropionic acid was charged in a 2 L kettle reactor equipped with an agitator, nitrogen purge, heating mantle, thermometer and condenser. The mixture was heated to 80° C. with a nitrogen purge for 30 minutes. N-methyl pyrrolidone, 60 grams, and 105 grams of 4,4'-methylene-bis(cyclohexyl isocyanate) were added to the reactor. The temperature of the reaction mixture was maintained at 80° C. for 30 minutes with agitation. Dibutyltin dilaurate, 0.2 g, was added to the reaction mixture. The reaction mixture was maintained at 80° C. for 2 hours. The resulting prepolymer was cooled to 60° C. and neutralized with 19.9 grams of triethylamine over 10 minutes.

The neutralized prepolymer was dispersed into a solution containing 537.4 grams of water, 2.7 grams of triethylamine, and 4.5 grams of piperazine hexahydrate, with vigorous agitation. A stable, homogeneous, aqueous polyurethane dispersion was obtained which was determined to have a particle size of <50 nm.

EXAMPLE 2

Preparation of an Aqueous Polyurethane Dispersion.

A mixture containing 136 grams of neopentyl adipate (1000 Mw), and 28.6 grams of dimethylolpropionic acid was charged in a 2 L kettle reactor equipped with an agitator, nitrogen purge, heating mantle, thermometer, and condenser. The mixture was heated to 80° C. with a nitrogen purge for 30 minutes. N-methyl pyrrolidone, 60 grams, and 105 grams of 4,4'-methylene-bis(cyclohexyl isocyanate) were added to the reactor. The temperature of the reaction mixture was maintained at 80° C. for 30 minutes with agitation. Dibutyltin dilaurate, 0.2 g, was added to the reaction mixture. The reaction mixture was maintained at 80° C. for one hour. The resulting prepolymer was cooled to 60° C. and neutralized with 23.8 grams of triethylamine over 10 minutes.

The neutralized prepolymer was dispersed into a solution containing 59.2 grams of water, 3.2 grams of triethylamine, and 4.5 grams of piperazine hexahydrate, with vigorous agitation. A stable, homogeneous, aqueous polyurethane dispersion was obtained which was determined to have a particle size of <50 nm.

EXAMPLE 3
Preparation of Polyurethane Hybrid Dispersion without Ureido Comonomer.

A 2 L 4-neck round bottom flask equipped with agitator, condenser and water bath was charged with 570 grams of deionized water, 380 grams of the aqueous polyurethane dispersion prepared in Example 2, and 12 grams of 10% aqueous ammonia solution. The mixture was stirred and heated to 65° C. with a nitrogen purge and a mixture of 3.36 grams of methyl methacrylate and 3.36 grams of butyl acrylate were added to the reactor. The mixture was heated to 75° C., and a solution of 0.12 grams of ammonium persulfate dissolved in 18.6 grams of water was added to the reactor. The reaction mixture was heated to 80° C. and held at this temperature for 30 minutes. A mixture of 64 grams of butyl acrylate and 266 grams of methyl methacrylate was metered into the reactor over 4 hours. Simultaneously, a solution of ammonium persulfate, 2.58 grams, 10% aqueous ammonia, 6 grams, and 45 grams water was metered into the reactor, over 4 hours. During the final 2 hours of the metered addition of the monomers and persulfate solution, 13.36 gram of a 25% solution of TERGITOL 15S40 (available from Union Carbide), was also metered into the reactor. After completion of the metered additions, the reactor contents were held at 80° C. for 30 minutes, then cooled to room temperature and adjusted to pH 8 with 10% aqueous ammonia. The final dispersion was homogeneous and translucent in appearance and was determined to have a particle size of 60 nm.

EXAMPLE 4
Preparation of Polyurethane Hybrid Dispersion with Ureido Comonomer.

An aqueous polyurethane dispersion was prepared according to the procedure set forth in Example 3 except that 1.0 pphm of N-(2-methacryloyloxyethyl)ethylene urea (ROHAMERE 6844-0) available from Rohm Tech Inc., was used to prepare the functionalized polymer. ROHAMERE 6844-0, 13.6 grams, was added to the mixture of butyl acrylate and methyl methacrylate and metered into the reactor over 4 hours.

EXAMPLE 5
Preparation of Polyurethane Hybrid Dispersion with Ureido Comonomer and Silane Monomer.

An aqueous polyurethane dispersion was prepared according to the procedure set forth in Example 4 except that 0.5 pphm of vinyltriisopropoxy silane (COATOSIL 1706) available from Witco, was used to prepare the functionalized polymer. COATOSIL 1706, 1.7 grams, was added to the mixture of butyl acrylate and methyl methacrylate and metered into the reactor over 4 hours.

EXAMPLE 6
Preparation of Polyurethane Hybrid Dispersion with Ureido Comonomer and Multifunctional Monomer.

An aqueous polyurethane dispersion was prepared according to the procedure set forth in Example 4 except that 0.7 pphm of 1,6-hexanediol dimethacrylate (MHOROMER MFM 423) available from Rohm Tech Inc., was used to prepare the functionalized polymer. MHOROMER MFM 423, 2.4 grams, was added to the mixture of butyl acrylate and methyl methacrylate and metered into the reactor over 4 hours.

EXAMPLE 7
Preparation of Polyurethane Hybrid Dispersion with Ureido Comonomer and UV Stabilizing Monomer.

An aqueous polyurethane dispersion was prepared according to the procedure set forth in Example 4 except that 0.5 pphm of NORBLOC 7966, was used to prepare the functionalized polymer. NORBLOC 7966, 1.7 grams, was added to the mixture of butyl acrylate and methyl methacrylate and metered into the reactor over 4 hours.

EXAMPLE 8
Preparation of Polyurethane Hybrid Dispersion with Ureido Comonomer, Silane Monomer, and Multifunctional Monomer.

An aqueous polyurethane dispersion was prepared according to the procedure set forth in Example 4 except that 0.5 pphm COATOSIL 1706 and 0.7 pphm MHOROMER MFM 423 were used to prepare the functionalized polymer. The COATOSIL 1706 and MHOROMER MFM 423 were added to the mixture of butyl acrylate and methyl methacrylate and metered into the reactor over 4 hours.

EXAMPLE 9
Preparation of Wood Coating Formulation.

The polyurethane hybrid dispersion which was prepared in Example 3 was formulated into the wood coating formulation described in Table I. The wood coating was evaluated for gloss according to ASTM D 523, Sward Rocker Hardness according to ASTM D 2134, Taber Wear Index according to ASTM D 4060-84 (three coats, 2–3 hours of drying between coats, 1000 gram load on CS-10 wheel), impact resistance according to ASTM D 2794, heat stability according to ASTM D 1849-80, freeze-thaw stability according to ASTM D 2243-82, and mechanical stability according to ASTM D 1417. The polyurethane hybrid dispersion prepared in Example 3 and formulated into a wood coating was evaluated against a commercially available wood coating formulation containing a polyurethane-acrylic hybrid dispersion (WITCOBOND A100 available from Witco). The test results are summarized in Table II.

TABLE I

| Ingredients | Weight (grams) | Supplier |
|---|---|---|
| Polyurethane Dispersion prepared in Ex. 3 (33% solid) | 688.7 | |
| Water | 46.6 | |
| ARCOSOLY PE | 22.7 | ARCO Chemical Co. |
| ARCOSOLY PTB | 22.7 | ARCO Chemical Co. |
| Propylene glycol | 41.3 | Union Carbide Corp. |
| ACRYSOL RM 825 | 4.1 | Rohm & Hass |
| BYK 024 | 2.7 | BYK Chemie |

TABLE I-continued

| Ingredients | Weight (grams) | Supplier |
|---|---|---|
| JONWAX 26 | 31.6 | S. C. Johnson |
| FLUORAD FC-129 | 0.1 | 3M Co. |

TABLE II

Wood Coating Performance Results

| | Example 3 | WITCOBOND A100 |
|---|---|---|
| 60° gloss: | >85 | >80 |
| 20° gloss: | >60 | >50 |
| Sward Rocker Hardness: | 30 | 26 |
| Taber Wear Index: | <50 | <40 |
| Impact resistance: | <120 lbs | <100 lbs |
| Heat Stability | Passed | Passed |
| Freeze-thaw Stability | >5 cycles | >5 cycles |
| Wet Adhesion | 950 cycles | 500 cycles |
| Mechanical stability | Passed | Passed |

The results in Table II show that the wood coating containing the polyurethane hybrid dispersion of Example 3 exhibited slightly better gloss and wet adhesion than the commercially available wood coating product. The other properties evaluated such as hardness, impact resistance, freeze-thaw stability and mechanical stability were determined to be approximately equivalent.

EXAMPLE 10

The Polyurethane Hybrid Dispersions prepared in Examples 3, 4 and 8, and WITCOBOND A100 were evaluated for wet adhesion in a semi-gloss paint formula at 25% pigment volume concentration (PVC) as described in Table III.

TABLE III

| | Amount (gms.) |
|---|---|
| GRIND | |
| Water | 33.7 |
| Propylene Glycol | 41.0 |
| BYK-156 | 3.1 |
| BYK-034 | 2.1 |
| AMP 95 | 1.0 |
| KRONOS 2020 | 214.2 |
| OMYACARB UF | 34.8 |
| LETDOWN | |
| Polyurethane Hybrid Dispersion | 681 |
| BYK-348 | 4.1 |
| ARCOSOLVE PE | 11.7 |
| ARCOSOLVE PTB | 17.5 |
| ACRYSOL RM - 825 | 13.6 |
| Total | 1057.8 |

Propylene Glycol is an anti-freeze additive.
BYK-156 is a acrylic copolymer.
BYK-034 is a defoamer
KRONOS 2020 is a titanium dioxide pigment.
AMP 95 is a buffer.
OMAYCARB UF is a silica extender pigment.
BYK-348 is a wetting agent.
ARCOSOLVE PE and ARCOSOLVE PTB are coalescing agents.
ACRYSOL RM 825 is an associative thickener.

In a high speed dispersator, the Grind was dispersed. The Letdown was added to the dispersion and mixed for 15 minutes. A 3 mil. thick coating of each paint sample was applied on the solvent-based alkyd coating and dried for 7 days at 25° C. The coating was scrubbed with Ajax until it breaks through the film. The test results are summarized in Table IV.

TABLE IV

Wet Adhesion

| | Example 3 | Example 4 | Example 8 | WITCO BOND A100 |
|---|---|---|---|---|
| Number of cycles to break through the film | 950 cycles | 2100 cycles | 2100 cycles | 500 cycles |

The test results in Table IV clearly show that the polyurethane hybrid dispersions prepared in Examples 4 and 8 which contained the ureido comonomer exhibited better alkyd wet adhesion than the polyurethane hybrid dispersion without the ureido comonomer prepared in Example 3 and the WITCOBOND A100 product.

EXAMPLE 11

Comparative Examples 3, 5, 6 and Example 7 were evaluated for chemical resistance according to ASTM D 1308. Three coats of the clear coating were applied on wood panel and dried for 7 days at 25° C. Several drops of chemicals were applied on the film and allowed to stand for one hour. The test results are summarized in Table V.

TABLE V

Chemical Resistance

| Chemical Test (0 = worst, 10 = best) | Example 3 | Example 5 | Example 6 | Example 8 | WITCO-BOND A100 |
|---|---|---|---|---|---|
| Ammonium hydroxide | 2 | 2 | 8 | 8 | 7 |
| Sodium hydroxide | 1 | 1 | 5 | 5 | 5 |
| 50% Ethanol | 1 | 8 | 6 | 8 | 5 |
| 100% Ethanol | 0 | 5 | 2 | 5 | 0 |
| LESTOIL | 5 | 5 | 10 | 10 | 4 |
| Isopropanol alcohol | 0 | 4 | 6 | 7 | 6 |

The test results in Table V show that the polyurethane hybrid dispersions prepared with a ureido comonomer and a multifunctional and/or silane of Examples 5, 6 and 8 exhibited significantly better chemical resistance than either the polyurethane hybrid dispersion of Example 3 which did not contain a ureido comonomer, or the commercially available WITCOBOND A100. It is noted that Example 8 wherein the functionalized polymer component of the polyurethane hybrid dispersion was prepared with a ureido comonomer, a silane monomer and multifunctional monomer exhibited the best chemical resistance among the coating formulations.

While the invention has been described with particular reference to certain embodiments thereof, it will be understood that changes and modifications may be made by those of ordinary skill within the scope and spirit of the following claims.

What is claimed is:

1. A polyurethane hybrid dispersion comprising:
   (a) 10 to 95 weight percent of a carboxylated polyurethane dispersion with at least 0.6 milliequivalents of carboxyl per gram of polyurethane, which is the reaction product comprising
      (I) at least one diisocyanate;
      (II) at least one polyester diol; and
      (III) at least one carboxylated diol; and
   (b) 5 to 90 weight percent of a functionalized polymer which is the emulsion polymerization product comprising at least one ethylenically unsaturated monomer and from 0.1 to 5 pphm of at least one ureido functional comonomer, wherein the functionalized polymer is prepared in the presence of the carboxylated polyurethane dispersion, and wherein the weight percents of the carboxylated polyurethane dispersion (a) and functionalized polymer (b) are based on the total solids of the polyurethane hybrid dispersion.

2. A polyurethane hybrid dispersion comprising:
   (a) 10 to 95 weight percent of a carboxylated polyurethane dispersion with at least 0.6 milliequivalents of carboxyl per gram of polyurethane, which is the reaction product comprising
      (I) at least one diisocyanate;
      (II) at least one polyester diol; and
      (III) at least one carboxylated diol; and
   (b) 5 to 90 weight percent of a functionalized polymer which is the emulsion polymerization product comprising at least one ethylenically unsaturated monomer and from 0.1 to 5 pphm of at least one ureido functional comonomer and a second comonomer which is selected from the group consisting of 0.01 to 2 pphm of a multifunctional monomer, 0.1 to 10 pphm of a silane monomer, and combinations thereof, wherein the functionalized polymer is prepared in the presence of the carboxylated polyurethane dispersion, and wherein the weight percents of the carboxylated polyurethane dispersion (a) and functionalized polymer (b) are based on the total solids of the polyurethane hybrid dispersion.

3. A method for providing a solvent resistant coating on at least one surface of an article comprising:
   (i) preparing a polyurethane hybrid dispersion comprising:
      (a) 10 to 95 weight percent of a carboxylated polyurethane dispersion with at least 0.6 milliequivalents of carboxyl per gram of polyurethane, which is the reaction product comprising
         (I) at least one diisocyanate;
         (II) at least one polyester diol; and
         (III) at least one carboxylated diol; and
      (b) 5 to 90 weight percent of a functionalized polymer which is the emulsion polymerization product comprising at least one ethylenically unsaturated monomer and from 0.1 to 5 pphm of at least one ureido functional comonomer, wherein the functionalized polymer is prepared in the presence of the carboxylated polyurethane dispersion, and wherein the weight percents of the carboxylated polyurethane dispersion (a) and functionalized polymer (b) are based on the total solids of the polyurethane hybrid dispersion;
   (ii) applying the polyurethane hybrid dispersion to an article; and
   (iii) curing the polyurethane hybrid dispersion with air.

4. An article coated with the polyurethane hybrid dispersion according to claim 3.

5. The polyurethane hybrid dispersion according to claim 1 wherein the carboxylated polyurethane dispersion (a) is present in an amount of from 20 to 50 weight percent and the functionalized polymer (b) is present in an amount of from 50 to 80 weight percent, based on the total solids of the polyurethane hybrid dispersion.

6. The polyurethane hybrid dispersion according to claim 5 wherein the carboxylated polyurethane dispersion (a) is present in an amount of from 25 to 40 weight percent and the functionalized polymer (b) is present in an amount of from 60 to 75 weight percent, based on the total solids of the polyurethane hybrid dispersion.

7. The polyurethane hybrid dispersion according to claim 1 wherein the diisocyanate is selected from the group consisting of 2,4-tolylene diisocyanate, 2,6-tolylene diisocyanate, 4,4'-diphenylmethane diisocyanate, m-phenylene diisocyanate, xylylene diisocyanate, tetramethylene diisocyanate, lysine diisocyanate, 1,4-cyclohenxylene diisocyanate, 4,4'dicyclohexylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, 4,4'-methylene-bis(cyclohexyl isocyanate), isophorone diisocyanate, and hexamethylene diiisocyanate, benzene, 1,3-bis(1-isocyanate-1-methylethyl), 4,4'-methylenebis (phenyl isocyanate), toluene 2,4-diisocyanate, and combinations thereof.

8. The polyurethane hybrid dispersion according to claim 7 wherein the diisocyanate is selected from the group consisting of 4,4'-methylene-bis(cyclohexyl isocyanate), isophorone diisocyanate, and hexamethylene diiisocyanate.

9. The polyurethane hybrid dispersion according to claim 1 wherein the polyester diol is the reaction product of at least one polyhydric alcohol and at least one polycarboxylic acid or polycarboxylic anhydride.

10. The polyurethane hybrid dispersion according to claim 9 wherein polyhydric alcohol is selected from the group consisting of ethylene glycol, propylene glycol, diethylene glycol, butanediol, hexanediol, neopentyl glycol and cyclohexanedimethanol, and the polycarboxylic acid is selected from the group consisting of glutaric acid, succinic acid, adipic acid, and phthalic acid or phthalic anhydride.

11. The polyurethane hybrid dispersion according to claim 1 wherein the carboxylated polyurethane is chain extended.

12. The polyurethane hybrid dispersion according to claim 11 wherein the carboxylated polyurethane is chain extended with a compound selected from the group consisting of water, diamine, piperazine, piperazine hexahydrate, diethylene triamine, triethylene tetraamine, ethylene diamine, and combinations thereof.

13. The polyurethane hybrid dispersion according to claim 1 wherein the ethylenically unsaturated monomer is selected from the group consisting of alkyl esters of acrylic and methacrylic acid, vinyl esters, unsubstituted or substituted acrylamides, and combinations thereof.

14. The polyurethane hybrid dispersion according to claim 13 wherein the alkyl esters of acrylic and methacrylic acid are selected from the group consisting of methyl methacrylate, butyl acrylate, methyl acrylate, ethyl acrylate and ethyl methacrylate.

15. The polyurethane hybrid dispersion according to claim 13 wherein the vinyl esters are selected from the group consisting of vinyl acetate, vinyl formate, vinyl propionate, vinyl butyrate, vinyl isobutyrate, vinyl valerate, vinyl 2-ethyl-hexanoate, vinyl isooctanoate, vinyl nonoate, vinyl decanoate, vinyl pivalate and vinyl versatate.

16. The polyurethane hybrid dispersion according to claim 13 wherein the acrylamide based monomers are selected from the group consisting of acrylamide, N,N-dimethylacrylamide, N-octyl acrylamide, and N-methylol acrylamide.

17. The polyurethane hybrid dispersion according to claim 1 wherein the ethylenically unsaturated monomer is selected from the group consisting of methylmethacrylate and butyl acrylate.

18. A coating composition comprising a polyurethane hybrid dispersion, wherein the polyurethane hybrid dispersion comprises:
(a) 10 to 95 weight percent of a carboxylated polyurethane dispersion with at least 0.6 milliequivalents of carboxyl per gram of polyurethane, which is the reaction product comprising
(I) at least one diisocyanate;
(II) at least one polyester diol; and
(III) at least one carboxylated diol; and
(b) 5 to 90 weight percent of a functionalized polymer which is the emulsion polymerization product comprising at least one ethylenically unsaturated monomer and from 0.1 to 5 pphm of at least one ureido functional comonomer, wherein the functionalized polymer is prepared in the presence of the carboxylated polyurethane dispersion, and wherein the weight percents of the carboxylated polyurethane dispersion (a) and functionalized polymer (b) are based on the total solids of the polyurethane hybrid dispersion.

19. The coating formulation according to claim 18 which further comprises an additive selected from the group consisting of defoamers, wetting agents, coalescing agents, slip aids, pigments, fillers, dyes, plasticizers, and combinations thereof.

20. The polyurethane hybrid dispersion according to claim 1 wherein the ureido functional comonomer is selected from the group consisting of N-methacrylamidoethylethylene urea, N-(2-methacryloyloxyethyl)ethylene urea, N-methacryloyl urea, 2-(1-imidazolyl) ethyl methacrylate, 2-(1-imidazolidin-2-on)ethylmethacrylate, N-(methacrylamido)ethyl urea, and combinations thereof.

21. The polyurethane hybrid dispersion according to claim 20 wherein the ureido functional comonomer is methacrylamidoethylethylene urea or N-(2-methacryloyloxyethyl)ethylene urea.

22. The polyurethane hybrid dispersion according to claim 2 wherein the ureido functional monomer is present in an amount of from 0.5 to 2 pphm.

23. The polyurethane hybrid dispersion according to claim 2 wherein the second comonomer is a multifunctional monomer selected from the group consisting of 1,6-hexanediol dimethacrylate, allyl methacrylate, 1,4-butanediol dimethacrylate, butanediol diacrylate, 1,3-butanediol dimethacrylate, polyglycol 400-dimethacrylate, neopentyl glycol dimethacrylate, triethylene glycol dimethacrylate, trimethylolpropane trimethacrylate, ethylene glycol dimethacrylate, diethylene glycol dimethacrylate, tetraethylene glycol dimethacrylate, trimethylopropane trimethacrylate, 1,12-dodecanediol dimethacrylate, methacrylic anhydride, bisphenol-A-dimethacrylate, ethoxylated bisphenol-A-dimethacrylate, triethyleneglycol dimethacrycate, dicyclopentyl acrylate, tetraethoxylated bisphenol-A-diacrylate, tetraethylene glycol dimethacrylate, trimethylopropane triethoxy triacrylate, diallyl phthalate, diallyl maleate, triallyl cyanurate, divinylbenzene, allylmethacrylate, and combinations thereof.

24. The polyurethane hybrid dispersion according to claim 23 wherein the multifunctional monomer is 1,6-hexanediol dimethacrylate.

25. The polyurethane hybrid dispersion according to claim 2 wherein the multifunctional monomer is present in an amount of from 0.1 to 1 pphm.

26. The polyurethane hybrid dispersion according to claim 2 wherein the second comonomer is a silane monomer selected from the group consisting of vinyltriisopropoxysilane, vinyltrimethoxysilane, vinyltriethoxysilane, vinyl-tris-(2-methoxyethoxy) silane, vinyl methyldimethoxysilane, gamma-methacryloxypropyltrimethoxysilane, and combinations thereof.

27. The polyurethane hybrid dispersion according to claim 26 wherein the silane monomer is vinyltriisopropoxysilane.

28. The polyurethane hybrid dispersion according to claim 2 wherein the silane monomer is present in an amount of from 0.5 to 5 pphm.

29. A polyurethane hybrid dispersion comprising:
(a) 10 to 95 weight percent of a carboxylated polyurethane dispersion with at least 0.6 milliequivalents of carboxyl per gram of polyurethane, which is the reaction product comprising
(I) at least one diisocyanate;
(II) at least one polyester diol;
(III) at least one carboxylated diol; and
(IV) from about 0.1 to about 5 pphm of at least one ureido functional comonomer; and
(b) 5 to 90 weight percent of a functionalized polymer which is the emulsion polymerization product comprising at least one ethylenically unsaturated monomer, wherein the functionalized polymer is prepared in the presence of the carboxylated polyurethane dispersion, and wherein the weight percents of the carboxylated polyurethane dispersion (a) and functionalized polymer (b) are based on the total solids of the polyurethane hybrid dispersion.

* * * * *